United States Patent [19]

Ohsaki et al.

[11] 4,076,125
[45] Feb. 28, 1978

[54] CARD RETRIEVAL SYSTEM

[75] Inventors: Mikio Ohsaki, Kashihara; Toshiaki Kawamoto; Osamu Fujimoto, both of Yamatokoriyama, all of Japan

[73] Assignee: Sharp Kabushiki Kaisha, Osaka, Japan

[21] Appl. No.: 688,697

[22] Filed: May 21, 1976

[30] Foreign Application Priority Data

| | | |
|---|---|---|
| May 22, 1975 | Japan | 50-61730 |
| Jun. 9, 1975 | Japan | 50-69835 |
| Jun. 23, 1975 | Japan | 50-77736 |

[51] Int. Cl.² .................. B07C 3/18; G06K 21/00
[52] U.S. Cl. ........................... 209/80.5; 209/111.8
[58] Field of Search .......... 209/80.5, 111.7 R, 111.8, 209/110.5

[56] References Cited

U.S. PATENT DOCUMENTS

| | | | |
|---|---|---|---|
| 3,554,373 | 1/1971 | Rothfusz et al. | 209/111.8 |
| 3,757,941 | 9/1973 | Anstin et al. | 209/80.5 |
| 3,785,486 | 1/1974 | Yanagawa | 209/111.8 X |
| 3,800,942 | 4/1974 | Hirata et al. | 209/80.5 |
| 3,841,480 | 10/1974 | Yanagawa | 209/80.5 |
| 3,942,642 | 3/1976 | Yanagawa | 209/80.5 X |

Primary Examiner—Robert B. Reeves
Assistant Examiner—Joseph J. Rolla
Attorney, Agent, or Firm—Birch, Stewart, Kolasch & Birch

[57] ABSTRACT

A card retrieval system in which each card is provided at its one peripheral edge with a magnetic strip which includes a unique notch structure for the purpose of retrieving individual cards. A plurality of selector bars are positioned in a manner to meet at right angles to a stack of the cards, while a magnet is positioned against the magnetic strips of the stacked cards. By the attracting force of the magnet, a specific card is slightly drawn out from the card stack in cooperation with the selector bars and the notch structure. Subsequent to this, locking members are operative to preclude the drawing out of the other cards and the plurality of the selector bars are withdrawn over the retrieved card transportation course. In this manner, the retrieval of a specific card is accomplished by the magnet.

8 Claims, 22 Drawing Figures

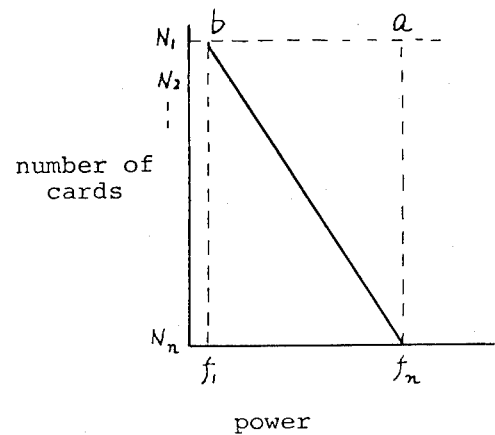
FIG. 12
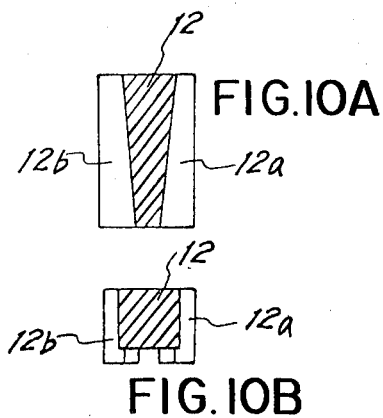
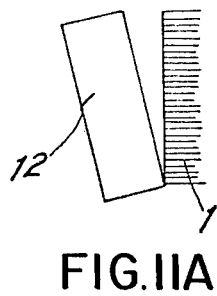
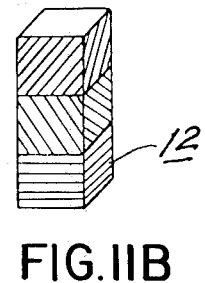
FIG.10A
FIG.10B    FIG.11A    FIG.11B

CARD RETRIEVAL SYSTEM

BACKGROUND OF THE INVENTION

The present invention pertains to a system for retrieving cards such as microfiche bearing cards wherein a specific card is selected and retrieved for the purpose of projecting onto a viewing screen images from the thus retrieved cards.

According to the prior art card retrieval systems a rotary drum was provided for accommodating a multiplicity of information bearing cards each having a unique code structure (for example, defined by magnetic material).

A specific card to be retrieved was detected by a proper magnetic selector assembly during revolution of the rotary drum and, the revolution of the rotary drum was thereafter inhibited to permit the specific card to be drawn out from a card stack.

However, it was necessarily required for the above discussed type of the prior art systems to initiate and complete the revolution of the rotary drum each time the respective one of the information bearing cards was to be retrieved. This prior art system required a relatively complex construction and was difficult to manipulate.

Accordingly, it is an object of the present invention to provide a selector assembly which can select a desired card from a multiplicity of information bearing cards without difficulty.

Pursuant to the principle of the present invention, a magnetic strip is secured on each of information bearing cards as means for selecting and retrieving a desired one of the cards from a card stack, the respective magnetic strip being provided with a unique coded notch structure. A plurality of selector bars are positioned in a manner to meet at right angles to the card stack and confront the respective magnetically coded edges of the cards. A magnet means spaced against the magnetic strips of the cards serves to attract only the magnetic strip of the specific card due to cooperation of the selector bars and the notch structures of the cards.

The above and other objects and novel features of the present invention are set forth in the appended claims and the present invention as to its organization and its mode of operation will best be understood from a consideration of the following detailed description of the preferred embodiments which are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 10A and 10B are side and plan views of a first modification in a magnet means provided in the card selector assembly;

FIGS. 11A and 11B are side and perspective views of a second modification in the magnet means;

FIG. 12 is a graph showing relationship between the number of the cards and the drawing force;

DETAILED DESCRIPTION OF THE INVENTION

Figure 1:
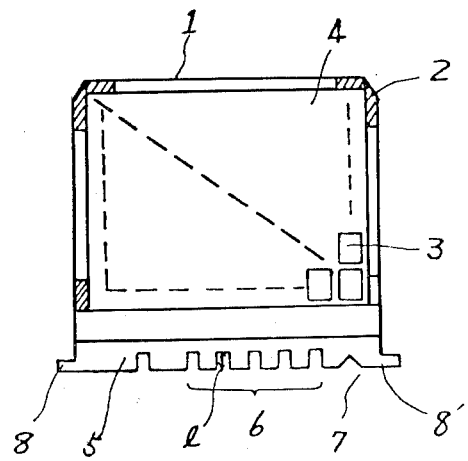
FIG. 1 is a plan view of an information bearing card useful with a retrieval system of the present invention.

FIG. 1 illustrates an example of an information bearing card 1 comprising a pair of plastics made transparent sheets of which the peripheries are adhered at the oblique line-defined regions by means of double-adhesive tape to form a cavity. Each of the microfiches 4 bearing a predetermined number of information items 3 is received within the cavity. The card 1 further includes a magnetic strip 5 provided at one of its peripheral region. A plurality of coded notches 6 of the depth *l* are formed in the margin of the magnetic strip together with a second notch 7 for the purpose of positioning. In addition, the magnetic strip 5 is provided at both ends with projections 8, 8' which are adapted to engage with locking means discussed hereinafter. Although in the given example the card 1 includes a cavity for accommodating the microfiches and the magnetic strip, the magnetic strip may be attached directly to the body of the card without the cavity.

Figure 2:
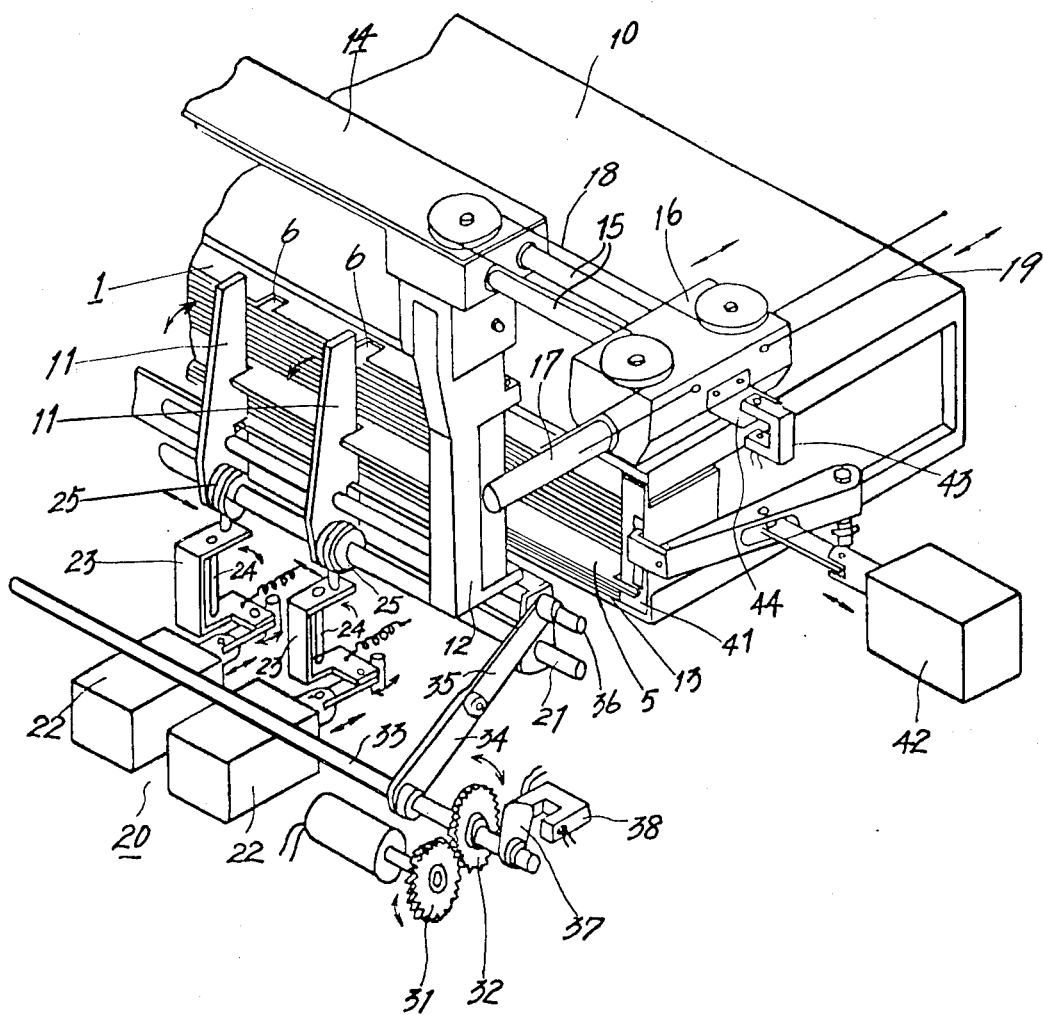
FIG. 2 is a perspective view of a magnetic type card selector assembly constructed in accordance with the present invention.

FIG. 2 illustrates a perspective view of a selector assembly constructed in accordance with the concept of the present invention. As discussed briefly, the selector assembly is such that a specific card 1 to be retrieved is selected by selector bars 11 and then drawn out from a stack of the cards 1 by a magnet means 12.

In FIG. 2, a multiplicity of information bearing cards 1 are received within an opened cartridge casing 10 in a manner that the aligned magnetic strips of the cards are exteriorly exposed through the opening 13 of the cartridge casing 10. A selected card transportation scheme 14 including the magnet means 12 is provided in a spaced relationship against the aligned magnetic strips 5. The card transportation scheme 14 is slidably supported through the use of an X axis guide rail 15 which in turn is slidable along a Y axis guide rail 17 through a support 16. Thus, the card transportation scheme 14 is settable closely adjacent to the opening 13 of the cartridge 10 in the retrieval system during the initial mode of the retrieval operation and movable with respect to both of the X and Y axes via wires 18 and 19 during subsequent modes.

In order to select a desired one of the cards 1 electromagnet the stack within the cartridge 10 in accordance with input information, a card selection means 20 is provided adjacent the opening 13 of the cartridge 20. The card selection means 20 includes a plurality of selector rods 11 the number of which is in correspondence to the bit number of the code notation defined by the respective notch structures of the cards 1. The respective selector bars 11 are individually rotatable and slidable on a common shaft 21. More particularly, the respective selector bars become operative to move selectively along the shaft 21 by actuators 22 each comprising an electromagnetic and a plunger and to stop at a position to engage with the notches 6 of the magnetic strip 5 of the preselected card 1. That is, upon receiving a code signal corresponding to the code identity of the specific card 1, the actuators 22 become operative individually and selectively so that selective rotation of levers 24 about their shafts allows the selector bars 11 to move selectively to the left or right in the direction of the shaft 21 via sliding wheels 25 in response to the input information. This selects the specific card 1 having the notch structure corresponding to the preselected positions of the selector bars 11.

Figure 3:
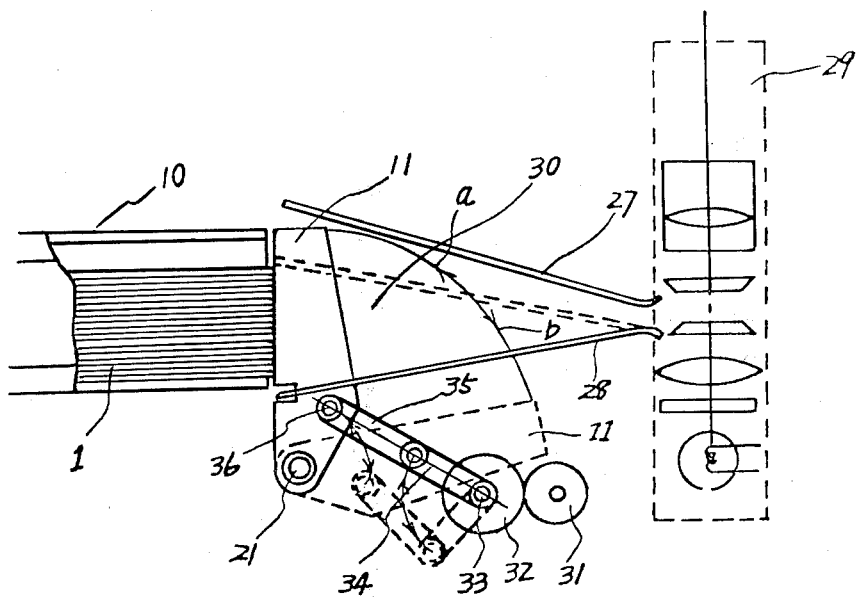
FIG. 3 is a side view of the card selector assembly shown in FIG. 2.

It will be clear from FIG. 3 that the respective selector bars 11 operate to rotate about the shaft 21 within a range of about 90° due to operation of a motor 26. During selection operation the selector bars 11 project upwardly in a manner to meet the alignment of the notch structures of the respective cards 1 within the cartridge 10 at right angles as depicted by solid line (FIG. 3). Subsequently, in transferring the thus selected card 1 via guide plates 27, 28 into an optical system of the retrieval system, all the selector bars 11 are inclined about 90° about the shaft 21 as to escape from the card drawing course 30.

Revolution of the motor 26 is transmitted via gearings 31 and 32 into a rotating shaft 33 to which one end of an arm 34 is secured. A second arm 35 has one end coupled rotatably with the other end of the first arm 34 and other coupled rotatably with an operator rod 36 for the selector bars 11. When the selector bars 11 project upwardly, the first and second arms 34 and 35 are correlated in a straight line as depicted by solid line. Such straight relationship blocks a tendency to rotate the selector bars 11 during selection, as will be discussed below.

At the initial mode of operation the selector bars 11 are positioned approximately as depicted by broken line in FIG. 3. The selecting operation of the card selecting means 20, namely, the sliding operation of the selector bars 11 responsive to the input information, is carried out while the selector bars 11 are shifted or moved from the initial mode of operation, defined by broken lines in FIG. 3, to the upwardly projecting position defined by solid lines in FIG. 3 via a 90° rotation. Reversible revolution and the operating period of the selector bars 11 are under the control of a photosensor 38 and its associated shutter 37 affixed to the shaft 33 as shown in FIG. 2.

Referring to FIG. 2, the reference 41 designates a card locking means provided at the side wall of the cartridge 10 and adapted to close the opening 13 of the cartridge 10 in response to operation of an actuator 42 comprising an electromagnet and a plunger.

The actuator 42 becomes operative at a point in time when the selected one of the cards 1 is somewhat withdrawn from the cartridge 10 by the operation of the magnet means 12 in response to an advance of the card transportation scheme 14 toward the optical system 29. This is determinative of the output from a Y axis positioning photosensor 43 which delivers detecting signals by sensing the position of a slit plate 44 provided at the side of the support 16 (FIG. 2).

Figure 4A:
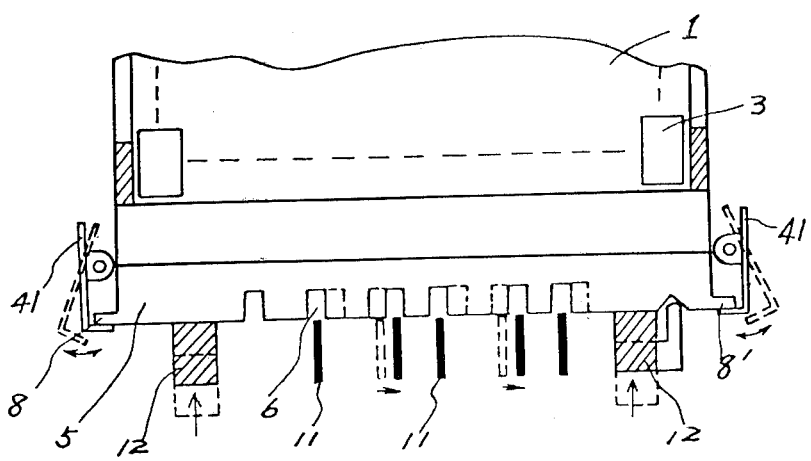
FIGS. 4A and 4B are explanatory diagrams showing the operational mode of the card selector assembly.
Figure 4B:
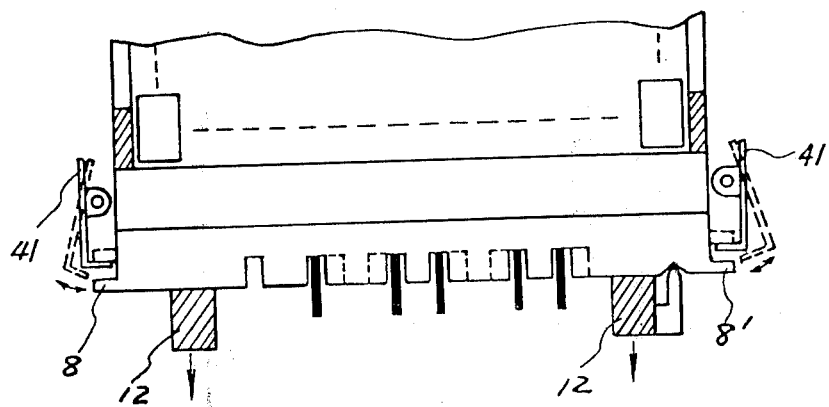
Figure 5:
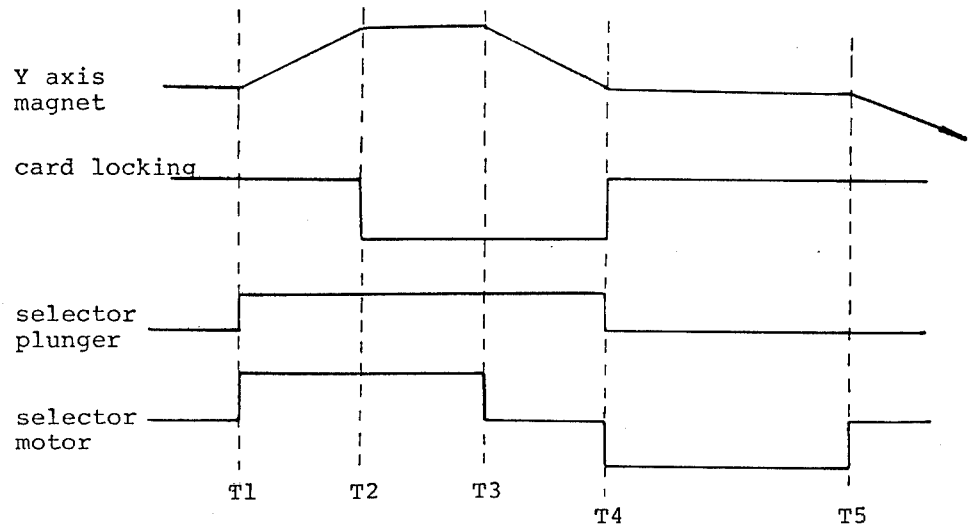
FIG. 5 is a timing chart showing timing relationship between individual components of the card selector assembly.

The following sets forth the operational sequence of the card transportation 14, the card selection means 20 and the card locking means 41 with reference to FIGS. 4A, 4B and 5.

Under the initial mode of the card selecting operation, the magnet means 12 of the card transportation 14 is waiting at the position defined by broken line in FIG. 4A and spaced at a distance from the alignment of the magnetic strips 5 of the cards 1. All the selector bars 11 are positioned approximately as shown in broken line in FIG. 3 at this time.

When the cartridge 10 is loaded into the selector assembly, the card transportation 14 is driven via the wire 19 toward the cartridge 10 upon application of the input information. Simultaneously, the magnet means initiates to advance in the direction designated by the arrow in FIG. 4A and the motor 26 is driven to rotate the selector bars 11 from the waiting position to the upwardly projecting position as shown by the arrow a in FIG. 3. Under these circumstances, the actuators 22 respond to the code representation of the input information so that the selector bars 11 correspondingly slide along the shaft 21 (T1 in FIG. 5). Subsequent to this, at T2 in FIG. 5, the magnet means 12 comes into contact with the card stack 1. The magnet means 12 is, of course, inhibited from further advancing toward the cartridge 10 and the card locking means 41 is forced into the opened mode as depicted by broken lines in FIG. 4A due to the operation of the actuator 42.

At the timing T3 in FIG. 5, the selector bars 11 complete their sliding and upwardly projecting operations. Completion of the upwardly projecting operation is sensed by the photosensor 38 which in turn inhibits revolution of the motor 26. The first and second arms 34 and 35 are kept in the straight line relationship, thereby locking or precluding rotation of the selector bars 11.

When the card transportation 14 is advanced toward the optical system 29 via the wire 19 and the magnet means 12 is advanced in the direction designated by the arrow in FIG. 4B, the magnetic strips 5 of the card stack 1 are attracted by the magnet means 12 and inclined to withdraw all the cards from the cartridge 10. However, the withdrawing of the cards 1 is inhibited by the selector bars 11 except for the specific card 1 having the notch structure corresponding to the instantaneous positions of the selector bars 11 which is attracted and withdrawn to a distance (equal to the depth $l$ of the notches 6) by the magnet means 12 as shown in FIG. 4B.

At the time T4 where the specific card 1 is withdrawn a predetermined distance, the photosensor 43 becomes operative to inhibit the Y axis travel of the card transportation 14 and to render the card locking means 41 operative. The result is that the opening 13 of the cartridge 10 is partly closed. Therefore, all the remaining cards 1 within the cartridge 10 are blocked to prevent their removal from the cartridge 10 due to cooperation of the protrusions 8 and 8' and the card locking means 41.

Upon receipt of the signal output from the sensor 43 the motor 26 initiates to rotate in the opposite direction, thereby rotating the selector bars 11 in the direction as shown by the arrow *b* in FIG. 3 in a manner to escape from the card traveling course 30. Then, they are restored to their initial mode positions. The actuators 22 of the card selection means 20 also are returned to the initial mode.

Thereafter, at the time T5, the card transportation 14 is again driven in the Y direction such that the selected card is positioned below the optical system 29 via the course 30. The selected card 1 is driven in the X direction via the wire 18 in a manner such that a desired frame of the selected card 1 is positioned below the optical system 29 for projection unto a viewing screen.

After completing the projection, the card transportation 14 is driven in the opposite direction in response to commands from an operational panel. The card locking means 41 is forced into its opened position and the guide plate 28 is raised up to the position as designated by broken lines in FIG. 3 to guide the specific card 1 into the uppermost stage of the cartridge 10. After the locking means 41 is again closed, the card transportation 14 is returned to its initial mode. A cycle of the information retrieval is completed in this manner. The card transportation 14 and the card selection means 20 at their initial positions are ready for the next retrieving operation.

Figures 6A, 6B:
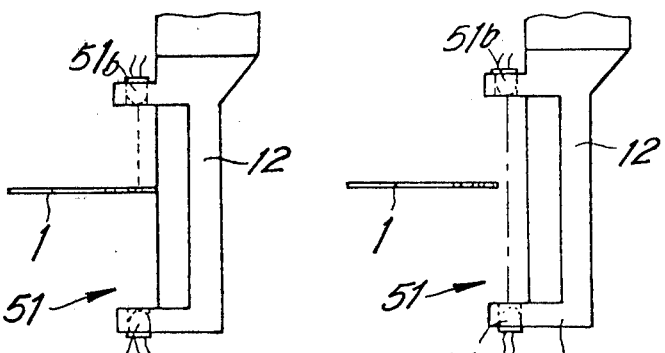
FIGS. 6A and 6B are side views showing a photosensor provided in the card selector assembly.

FIGS. 6A and 6B illustrate construction of a photosensor 51 for sensing the contacting state between the magnet means 12 and the cards 1. This includes a combination of a light emitting element 51*a* and a light responsive element 51*b* retained by holders 52. When the cards 1 are kept in contact with the magnet means 12, the photosensor 51 delivers no output. The output from the photosensor 51 is used to determine or control the operation of the X - Y transportation.

Figure 7A:
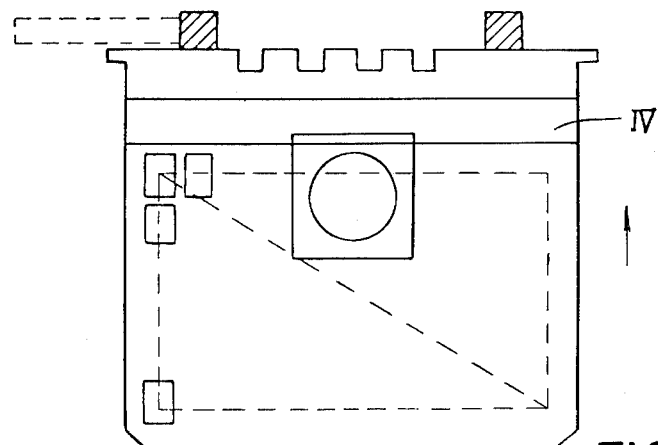
FIGS. 7A and 7B . explanatory diagrams showing the operation of the photosensor of FIGS. 6A and 6B.
Figure 7B:
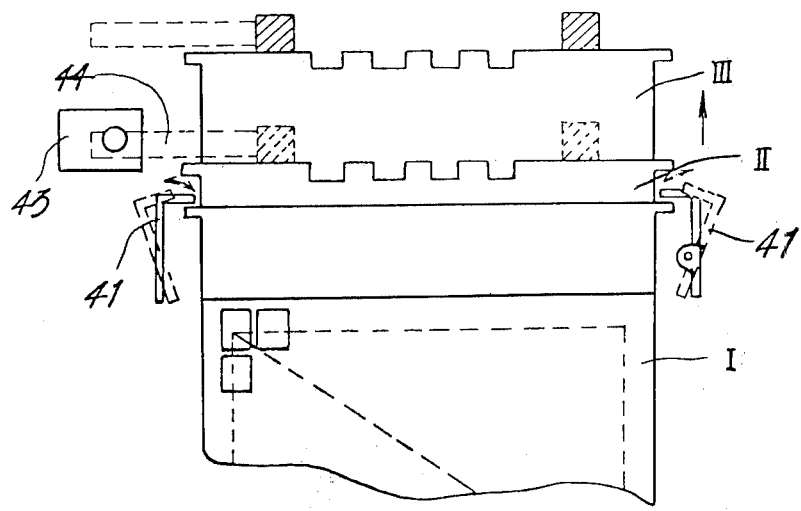

Referring to FIGS. 7A and 7B the status I designates the position when the cards 1 are received within the cartridge 10. At this time the card locking means 41 is positioned as suggested by broken lines.

The status (II) designates the position when the card selection is completed and the Y axis transportation is temporarily or provisionally stopped. The positioning of the Y axis transportation is determined by the photosensor 43 discussed above. The photosensor 51 performs its first function at this status. In the event that the selected card 1 is erroneously separated from the magnet means 12 for whatever reason, the Y axis transportation is reversed to restart the selection procedure. If both are in contact with each other, the selector bars 11 will be declined so that the operation of the Y axis transportation is restarted to allow the withdrawing of the selected card 1.

The status (III) is the position where a predetermined period of time has elapsed after re-start of the Y axis transportation. The position of the Y axis transportation is determined by counting the number of input pulses to a pulse motor associated with the Y axis transportation. The photosensor 51 performs its second function under the present status. When both are not kept in contact, the Y axis transportation is returned to regain the contacting relationship.

Conversely, when in contact, the function is effected to separate the selected card completely from the cartridge 10. The last status (IV), FIG. 7A, is one where the desired card is somewhat withdrawn or completely separated from the cartridge 10.

Figure 8:
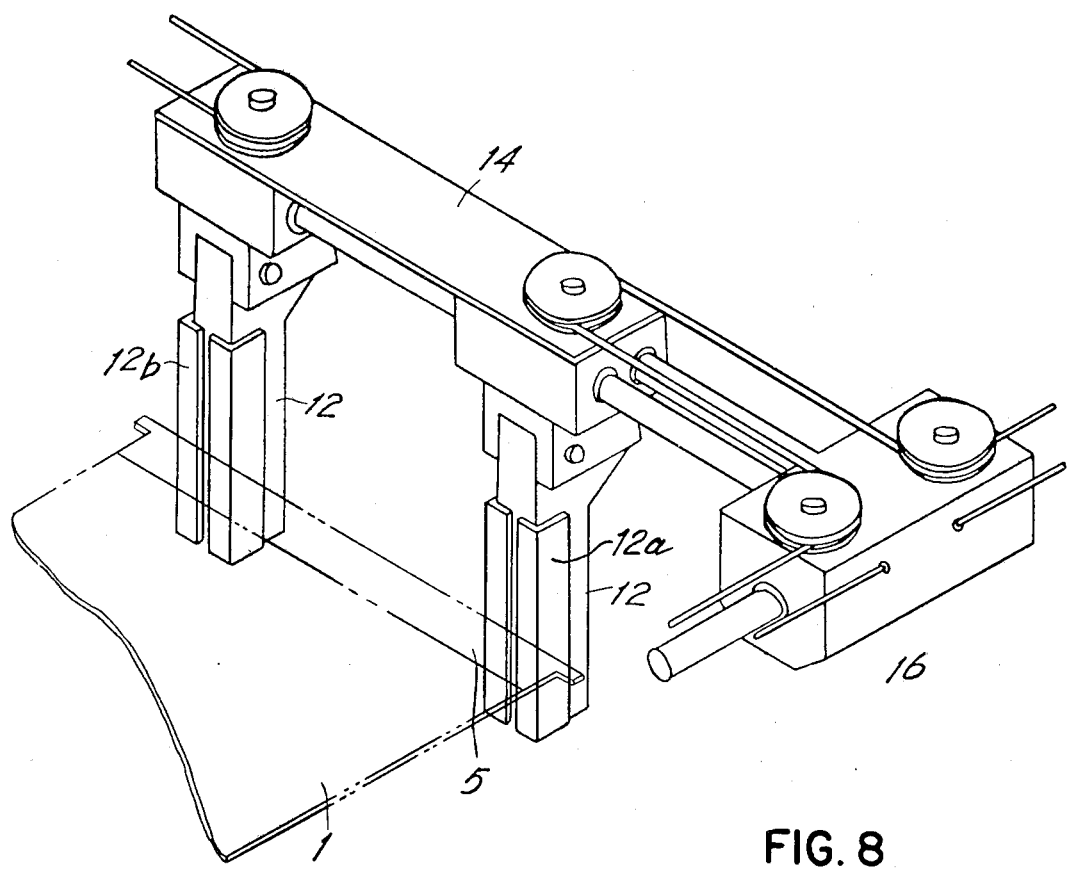
FIG. 8 is a rear view of the card selector assembly wherein a modification of the photosensor of FIGS. 6A and 6B is provided.
Figure 9A:
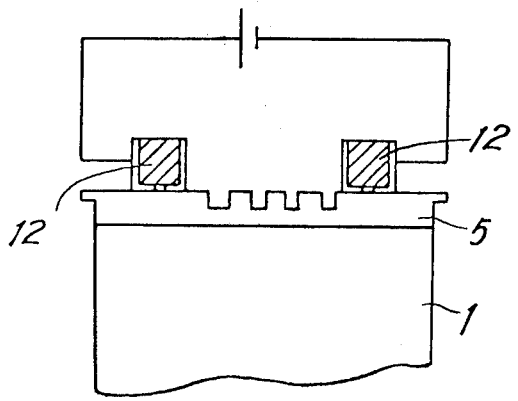
FIGS. 9A and 9B are explanatory diagrams showing the operational mode of the modification of FIG. 8.
Figure 9B:
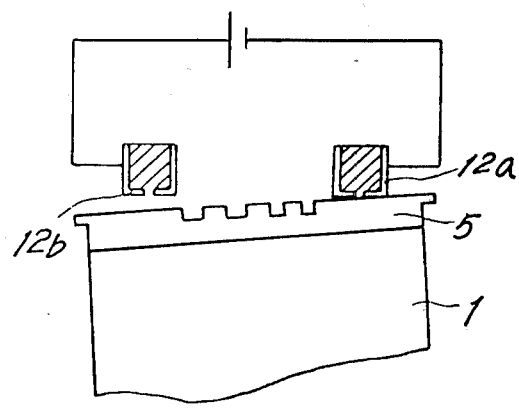

FIG. 8 and FIGS. 9A and 9B illustrate another form of the sensor 51 for detecting the contact relationship between the magnet means 12 and the card 1. This modified form is dependent upon utilization of the fact that the magnet material 12 of the card transportation 14 is electrically conductive and the magnetic strips 5 of the cards 1 also are electrically conductive. As viewed from FIGS. 9A and 9B, left and right magnet plates 12*a* and 12*b* are wired. This permits the sensing of an electrical connection between the magnetic strip 5 and the magnet means 12.

FIGS. 10 through 15 inclusive illustrate a variety of improvements in the magnet means 12 for meeting a requirement for reducing the attraction force thereof and hence simplifying magnet means structure.

In the example of FIGS. 10A and 10B, the working area of the magnet means 12 effective to attract the selected card 1 is of a downward oriented wedge shape to decrease its electromagnetically attracting force from the top to the bottom.

FIG. 11A illustrates another example wherein the working area of the magnet means 12 is inclined with respect to the alignment of the cards 1 wherein the example shown in FIG. 11B comprises a plurality of magnet members each having a different electromagnetic force. It is obvious from FIG. 12 that the power required for the separation of the non-selected cards from the magnet means 12 in the examples of FIGS. 10A, 10B and 11A, 11B corresponds to an area surrounded by four points $N_1$, $N_n$, $f_n$ and b. However, the magnet means showing uniform distribution of the attracting force needs the power surrounded by the points $N_1$, $N_n$, $f_n$ and a. Needless to say, the examples shown in FIGS. 10A, 10B, 11A and 11B ensure remarkable reduction in the power required for separation of the non-selected cards from the magnet means.

Figures 13A, 13B:
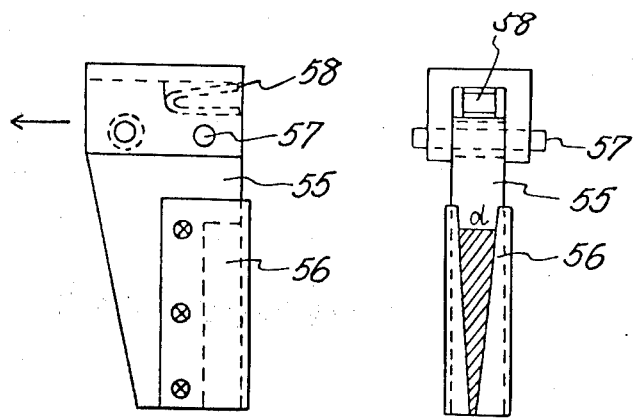
FIGS. 13A and 13B are front and side views of a third modification in the magnet means.

FIGS. 13A and 13B illustrate still another example wherein the magnet means is rotatable about a pivot at its upper end. A support 55 carrying the magnet 56 therein is rotatable about a shaft 57. A spring 58 is loaded to return the rotatable magnet means 12 to its initial position.

Figure 14:
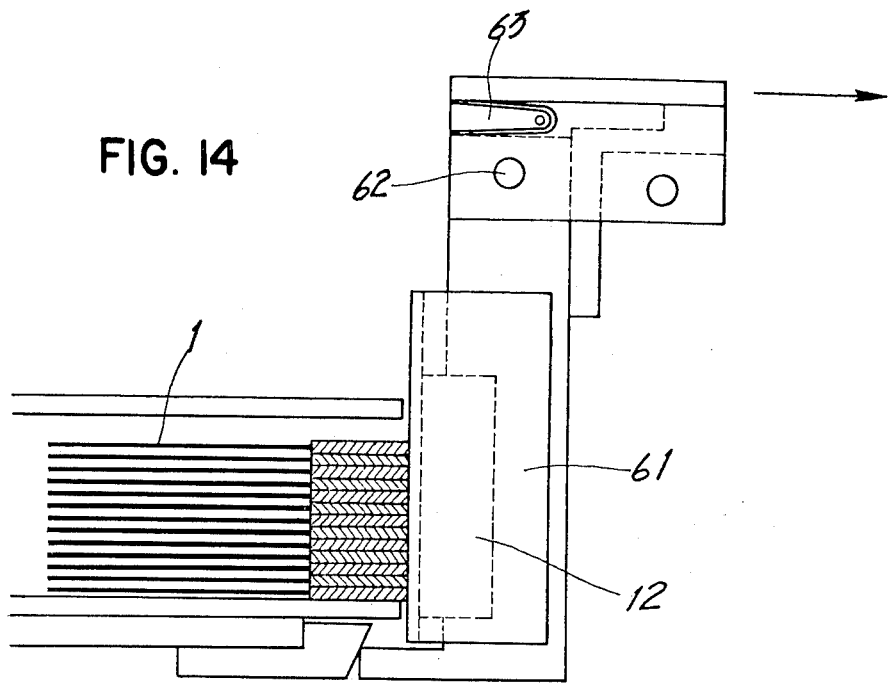
FIG. 14 is a front view of a fourth modification in the magnetic means.
Figure 15:
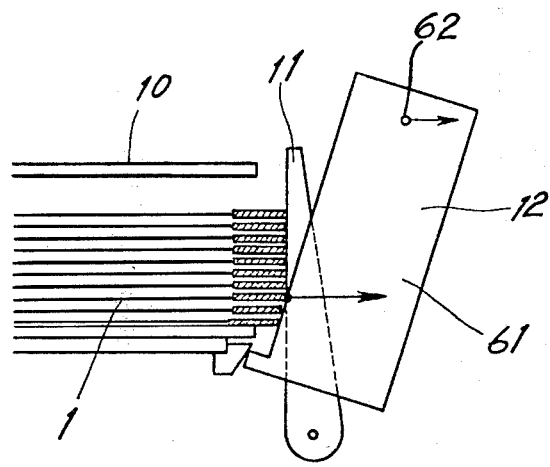
FIG. 15 is an explanatory diagram showing the operational principle of the fourth modification of FIG. 14.

FIGS. 14 and 15 illustrate additional embodiments in which the magnet means is rotatable about its lower end. This example also includes a frame 61 carrying the magnet 12, movable about its lower end, a shaft 62 and a spring 63 in the same manner as the example shown in FIGS. 13A and 13B.

While only certain embodiments of the present invention have been described, it will be apparent to those skilled in the art that various changes and modifications may be made therein without departing from the spirit and scope of the invention, and all such modifications as would be obvious to one skilled in the art are intended to be included within the scope of the following claims.

What is claimed is:

1. A card retrieval system comprising:
   a multiplicity of cards stored in a stationary stack structure, each of said cards being provided with a face which includes a magnetic strip and a notch structure formed in the magnetic strip;
   means for receiving input information for the purpose of selecting a specific card;
   magnet means for magnetically attracting the cards;
   a predetermined number of selector bars adapted to engage with the notch structures of the cards;
   said selector bars being mounted to be rotatable from an inoperative to an operative position and to be laterally displaceable relative to the stationary stack structure;

said selector bars being mounted to be movable along the face of the cards in response to input information; and said selector bars when in the operative position block the attraction between the magnet means and the non-selected cards to thereby select the selected one of the cards in response to the positioning of the selector bars which is determined by the input information and the attraction of the magnet means.

2. A card retrieval means as defined in claim 1 further comprising a card transportation scheme for transmitting the selected card into an optical system for projection onto a viewing screen.

3. A card retrieval system as defined in claim 1 wherein the magnet means manifests non-uniformity in its attracting force.

4. A card retrieval system as defined in claim 1 wherein means is provided for determining contact relationship between the selected card and the magnet means.

5. A card retrieval system as defined in claim 1 wherein the magnet means is rotatable about a lower end thereof.

6. A card retrieval system as defined in claim 1 wherein the selector bars are movable to escape from the card traveling course.

7. A card retrieval system as defined in claim 6 wherein the selector bars responsive to the input information are rotatable and reciprocatable mounted on a common shaft.

8. A card retrieval system comprising:

a multiplicity of cards stored in stationary stack structure, each of said cards being provided with a face which includes a magnetic strip and a notch structure formed in the magnetic strip;

means for receiving input information for the purpose of selecting a specific card;

magnet means for magnetically attracting the cards;

a predetermined number of selector bars adapted to engage with the notch structures of the cards;

means for positioning said selector bars at desired positions in response to said input information, thereby allowing said specific card to be drawn out by said magnet means further than non-selected cards;

support means for rotatably supporting said magnet means at one end thereof;

means for shifting said support means in the direction of the rotation of said magnet means; and fulcrum means for engaging the other end of said magnet means, whereby said magnet means are rotated about said fulcrum means when said support means are shifted.

* * * * *